Dec. 10, 1940.  H. W. WEBB  2,224,172
DUST COLLECTING ELEMENT AND PROCESS FOR MAKING THE SAME
Filed Nov. 9, 1934  6 Sheets-Sheet 1
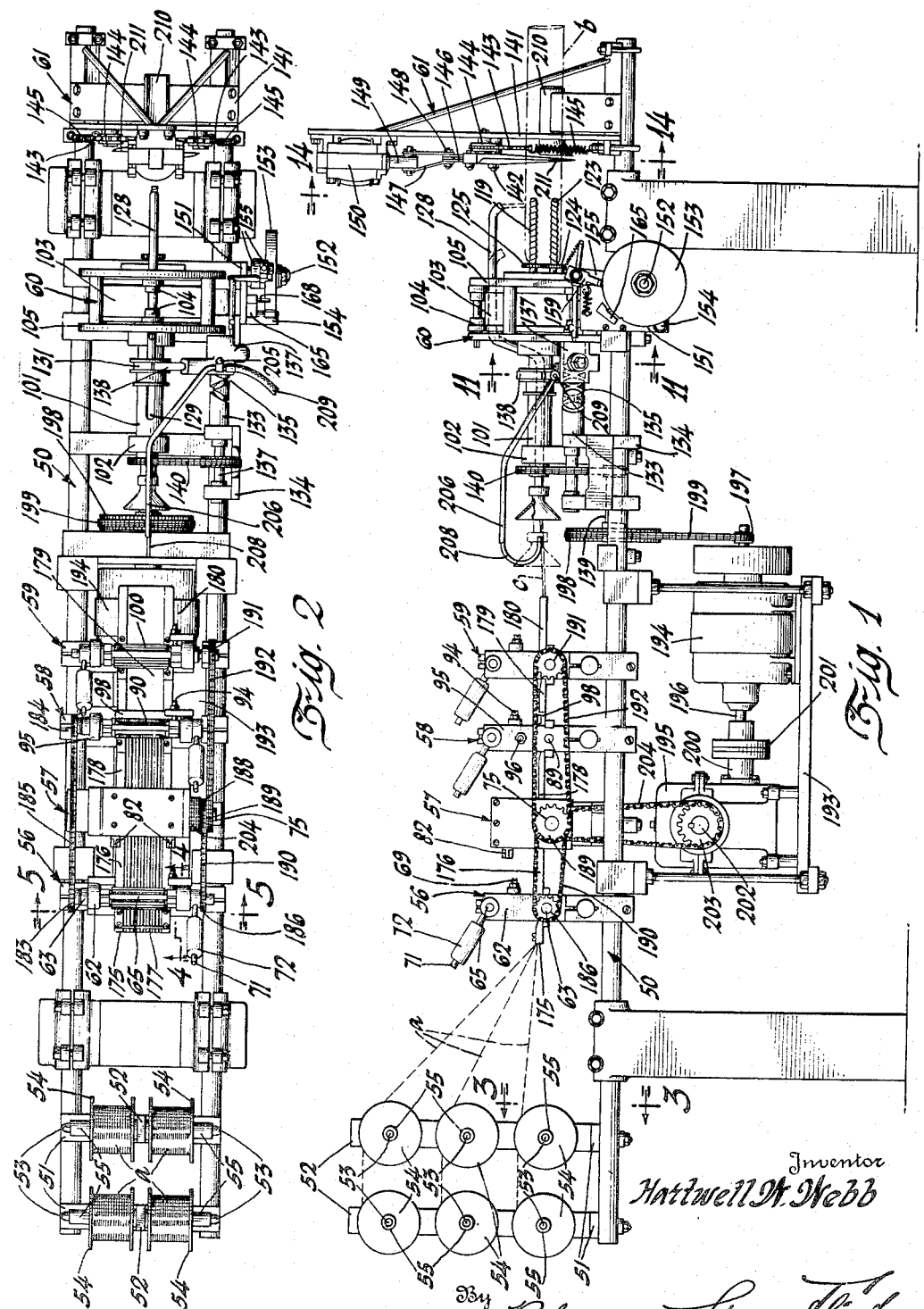
Inventor
Hartwell W. Webb
By
Blackmore, Spencer & Flint
Attorneys

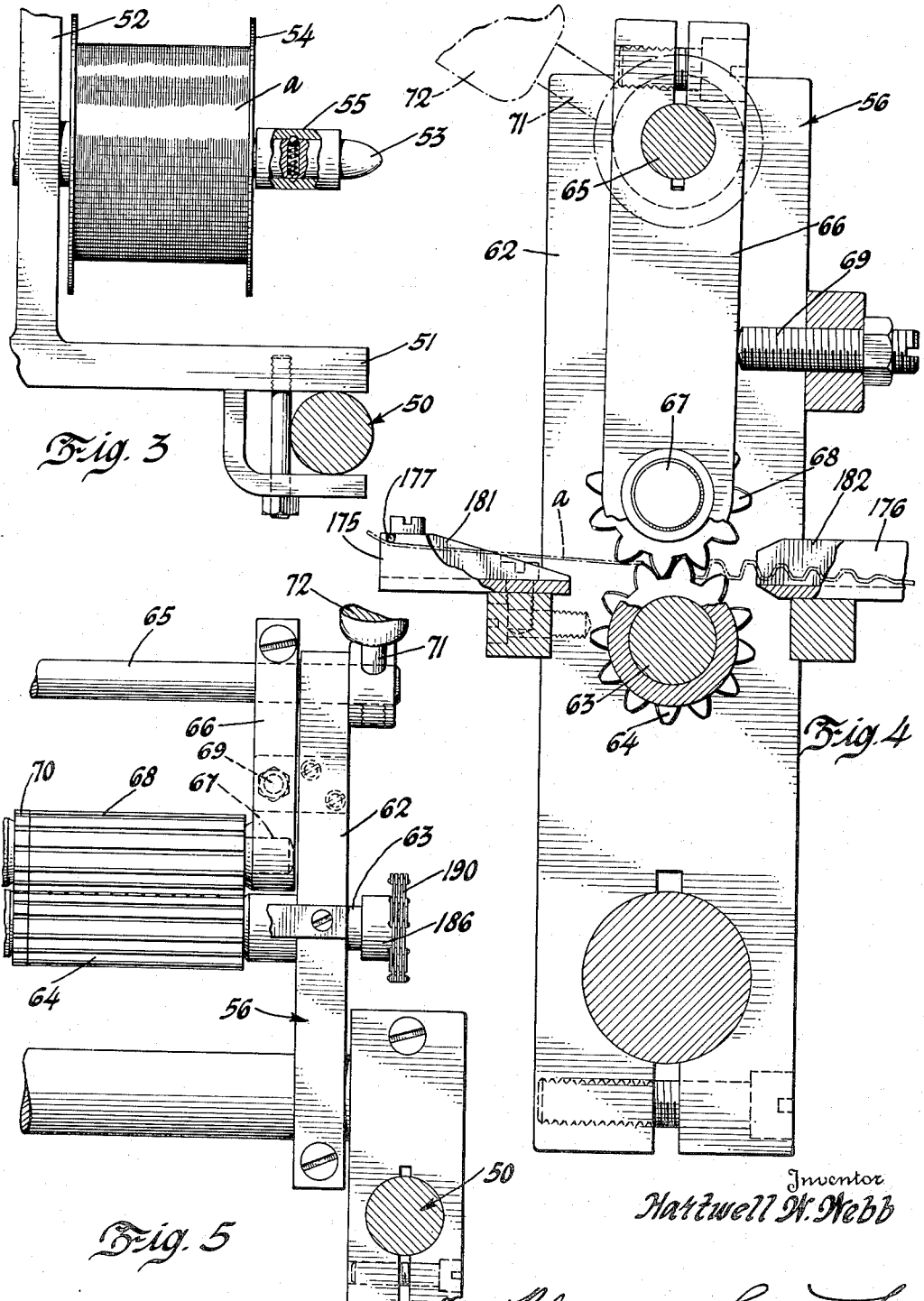

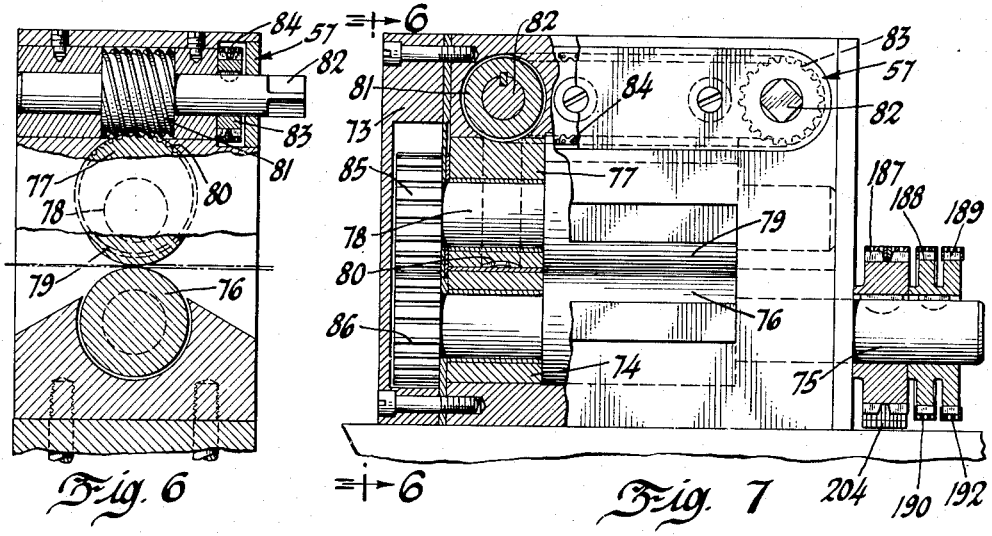
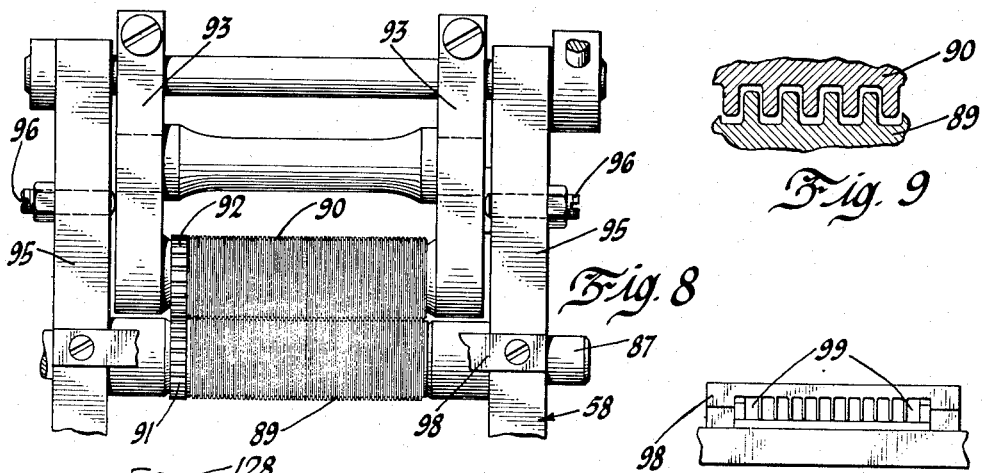
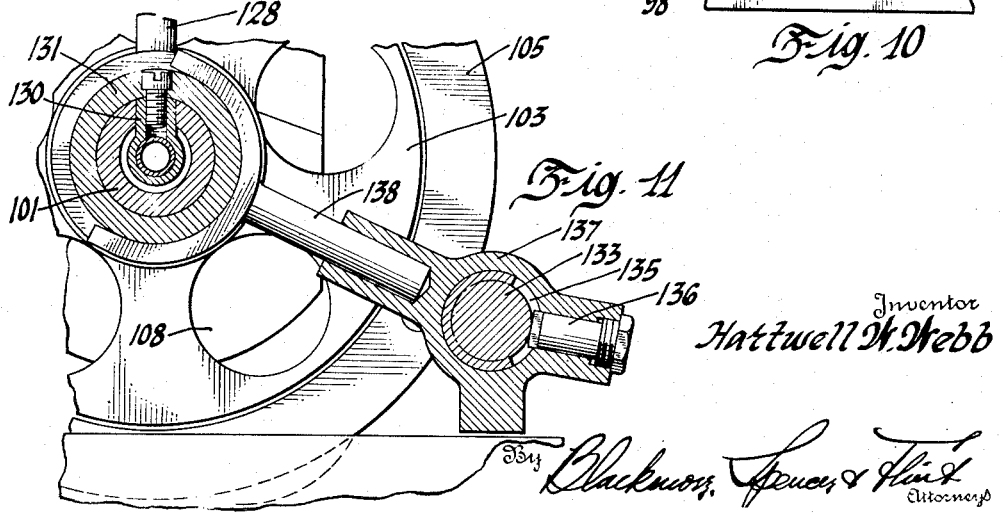

Dec. 10, 1940. H. W. WEBB 2,224,172
DUST COLLECTING ELEMENT AND PROCESS FOR MAKING THE SAME
Filed Nov. 9, 1934 6 Sheets-Sheet 4

Inventor
Hattwell W. Webb

Blackmun, Spencer & Fluck
Attorneys

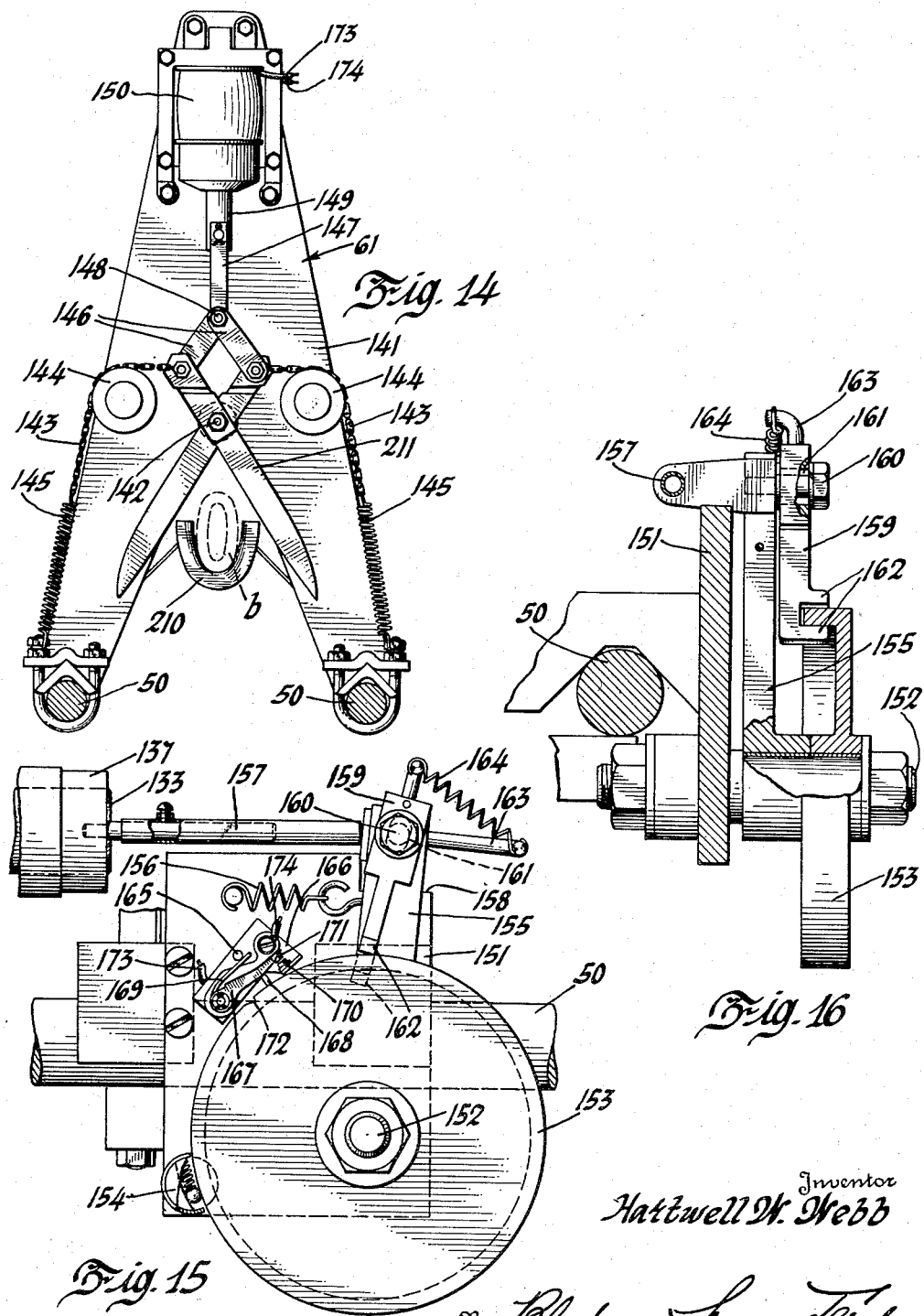

Dec. 10, 1940.  H. W. WEBB  2,224,172
DUST COLLECTING ELEMENT AND PROCESS FOR MAKING THE SAME
Filed Nov. 9, 1934  6 Sheets—Sheet 6

Inventor
Hartwell W. Webb
By Blackmore, Spence & Flint
Attorneys

Patented Dec. 10, 1940

2,224,172

UNITED STATES PATENT OFFICE 2,224,172

DUST COLLECTING ELEMENT AND PROCESS FOR MAKING THE SAME

Hartwell W. Webb, Flint, Mich., assignor to General Motors Corporation, Detroit, Mich., a corporation of Delaware Application November 9, 1934, Serial No. 752,232

16 Claims. (Cl. 140—71)

This invention relates to apparatus for removing dust from air and, in particular, to a dust-collecting element which consists of a liquid-coated interstitial body through which air is adapted to pass and on whose liquid-coated surfaces the dust in the air is adapted to be caught and retained.

The principal object of this invention is to provide a dust-collecting element of the type described which will offer low, uniform and stable resistance to the passage of air and yet will afford a sufficient area of liquid-coated surface to insure that the air which passes therethrough will be thoroughly freed from dust. It is a further object of this invention to provide a dust-collecting element with the described characteristics which may be produced cheaply and economically and to provide a process and apparatus for producing it cheaply and economically.

For a better understanding of the nature and objects of this invention, reference is made to the following specification and the accompanying drawings wherein the invention is described and illustrated.

In the accompanying drawings:

Figure 1 is a side elevation of the machine which I have designed for producing the dust-collecting element to which this invention relates;

Figure 2 is a plan view of the machine;

Figure 3 is an enlarged fragmentary elevation of one of the spindle-carrying fixtures of the machine, viewed as indicated by the line 3—3 of Figure 1, with a spool of wire mounted on the illustrated spindle;

Figure 4 is an enlarged section, taken on the line 4—4 of Figure 2, of the first wire-deforming element and associated parts of the machine.

Figure 5 is an enlarged fragmentary end elevation of the first wire-deforming element, viewed as indicated by the line 5—5 of Figure 2;

Figure 6 is an enlarged view, partly in side elevation from the standpoint indicated by the arrows 6—6 of Figure 7 and partly in section of the wire-flattening element of the machine;

Figure 7 is an enlarged view, partly in end elevation and partly in section, of the wire-flattening element;

Figure 8 is an enlarged end elevation of the second wire-deforming element of the machine with a part broken away so that the view of the rolls will not be obscured;

Figure 9 is a further enlarged fragmentary section through the rolls of the second-wire deforming element taken in the plane of the axes of the rolls;

Figure 10 is an end elevation of the part of the second wire-deforming element which is broken away in Figure 8;

Figure 11 is an enlarged fragmentary view of the winding element of the machine taken as indicated by the line 11—11 of Figure 1;

Figure 14 is an enlarged end elevation of the shearing element of the machine viewed as indicated by the line 14—14 of Figure 1;

Figure 15 is an enlarged side elevation of the timing mechanism for the shearing element and associated parts of the machine;

Figure 16 is a view, partly in section and partly in end elevation, of the timing mechanism;

Figure 12:
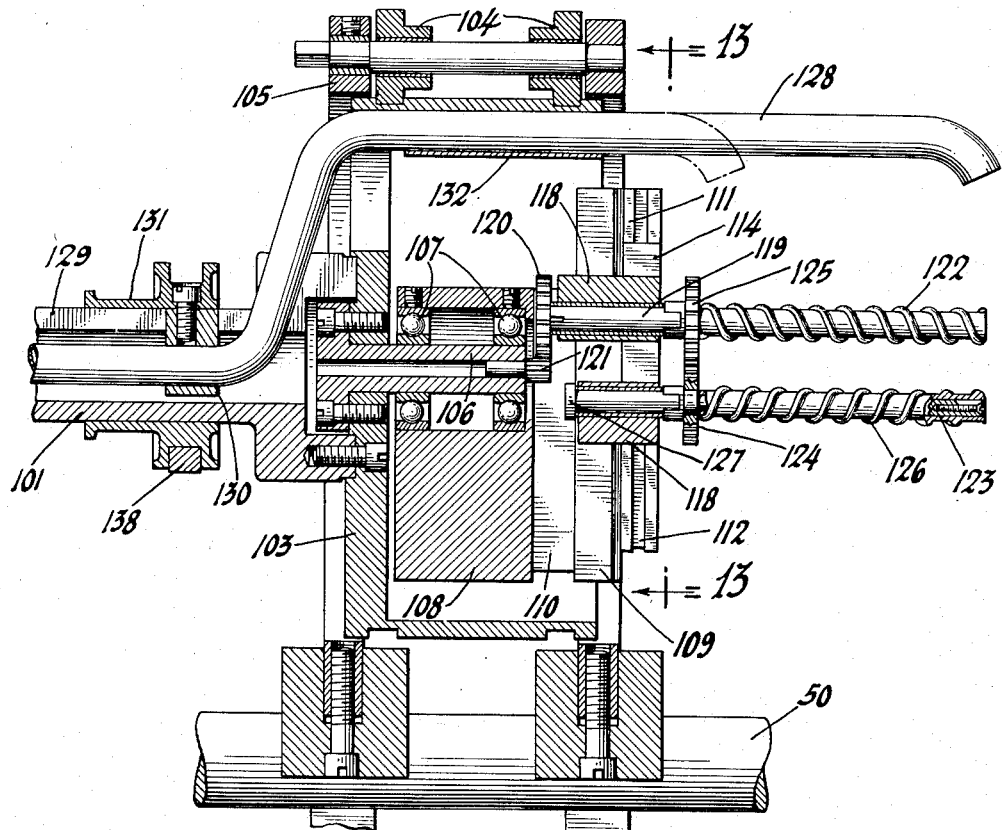
Figure 12 is an enlarged fragmentary longitudinal section through the winding element.
Figure 13:
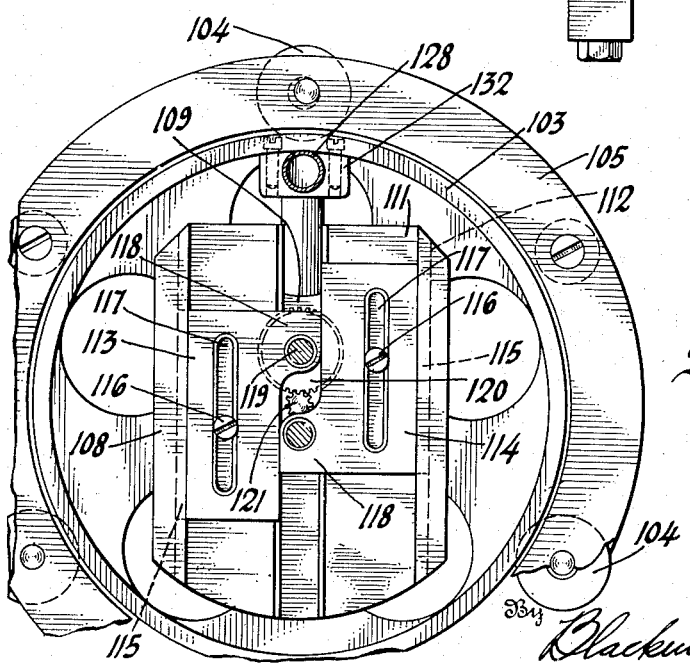
Figure 13 is a fragmentary end elevation of the winding element viewed as indicated by the line 13—13 of Figure 12.
Figures 17, 18, 19:
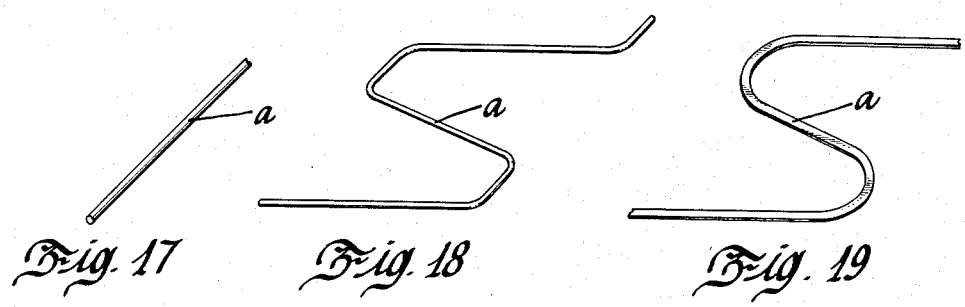
Figures 20, 21:
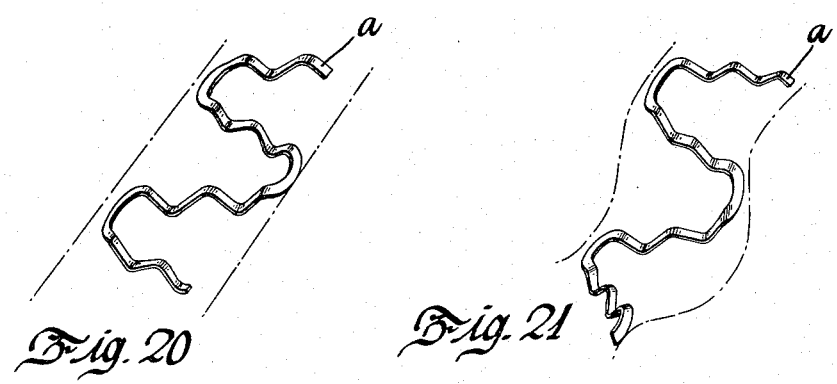
Figures 22, 23, 24, 25:
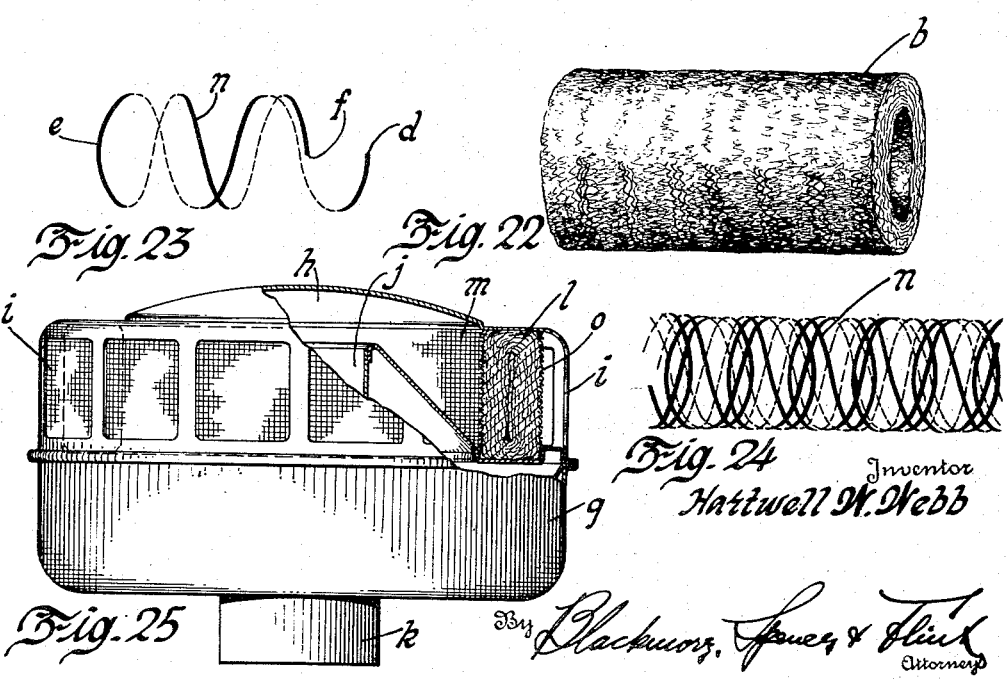

Figures 17, 18, 19, 20 and 21 are enlarged views of a fragment of one of the strands of wire from which the dust-collecting element to which the invention relates is made; Figure 17 shows the strand in its original form; Figure 18 shows the strand after it has passed through the first wire-deforming element; Figure 19 shows the strand after it has passed through the wire-flattening element; Figure 20 shows the strand after it has passed through the second wire-deforming element; Figure 21 shows the strand after it has passed through the third wire-deforming element. The dash-and-dot lines have been placed on opposite sides of the fragments of the strand in Figures 20 and 21 to emphasize the change produced in the form of the strands by the third wire-deforming element;

Figure 22 is a view of a length of the dust-collecting element to which this invention relates;

Figure 23 is a diagrammatic view which illustrates the formation of the dust-collecting element to which this invention relates;

Figure 24 is what may be described as a "skeleton" view of a length of the dust-collecting element to which this invention relates;

Figure 25 is an elevation, with parts broken away and in section, of an air cleaner in which the dust-collecting element to which this invention relates is incorporated.

In making a dust-collecting element in accordance with this invention, I take several strands of rather small copper wire and by suitable operations flatten and deform them. The several flattened and deformed strands are then concurrently and together wound around an arbor so that they advance alternately for a distance in one direction and for a different distance in the opposite direction along the axis of the arbor as they advance around it. This procedure is continued indefinitely and as a result thereof there is produced an interstitial tubular element whose components are maintained in the relative positions in which they are wound by a sort of felting action—i. e., by interengagement of the deformations in the contiguous strands. The tubular element after being cut into suitable lengths and impregnated with a suitable liquid, such as oil, is ready for installation in an air cleaner. If desired, the tubular element may be flattened and stitched longitudinally before it is cut into lengths and impregnated but the flattening and stitching operations are not essential elements of my process. Obviously, the tubular element will offer little resistance to the passage of air in any direction, will be stable in form and will afford a large area of surfaces which may be coated with liquid. Furthermore, if the pitch or pitches of the turns are properly selected with reference to the width of the group of strands employed, the tubular element will also be, in directions transverse of its axis, of substantially uniform intersticity. And it may be added that because the flat surfaces of the strands are inevitably disposed at all angles in the tubular element, air passing therethrough will be deflected from one surface to another and, therefore, come into contact with a greater area of liquid-coated surface and be more thoroughly cleaned than it would if the flat surfaces were inclined in only one direction.

The machine illustrated in the accompanying drawings automatically performs speedily and economically, among others, the operations, except the flattening and stitching operations, described in the next preceding paragraph.

This machine consists of a suitably supported main frame 50 on one end of which there are mounted two fixtures 51. Each of these fixtures includes an upstanding arm 52 and from each side of each of the arms 52, there projects a spindle 53 which is adapted to support a spool 54 of rather small copper wire a. To prevent accidental removal of the spool therefrom, there is provided on the outer end of each spindle a removable collar 55.

On the main frame 50, there are also mounted three wire-deforming elements 56, 58 and 59, a wire-flattening element 57, a winding element 60 and a shearing element 61.

The first wire-deforming element 56 includes a pair of upstanding arms 62 which are fixed to the main frame 50. In the arms 62, there are journaled a shaft 63 to which is keyed a fluted roll 64 and, above the shaft 63, a shaft 65 to which there are fixed a pair of normally dependent arms 66. In the free ends of the arms 66, there is journaled a shaft 67 to which is keyed a fluted roll 68. The flutes in the rolls 64 and 68 extend from one end to the other of the rolls and are formed by cutting gear teeth in the rolls. When one of the arms 66 is in engagement with the set screw 69 which is carried by the adjacent upstanding arm 62, the teeth on the rolls 64 and 68 interfit throughout their lengths but interengage only at one extremity 70 because at all other points they are slightly relieved. So that the arms 66 may be moved angularly about the axis of the shaft 65 to shift the roll 68 to and from the position in which its teeth interfit with the teeth on the roll 64, there is provided on the shaft 65 a handle 71 on which there is adjustably mounted a weight 72 which tends to maintain the arm 66 in engagement with the set screw 69.

The wire-flattening element 57 includes a frame 73 which is fixed to the main frame 50. In the frame 73, through the medium of bushings 74, there is journaled a shaft 75 on whose intermediate portion there is formed a smooth cylindrical roll 76. Above the bushings 74, there are journaled in the frame 73 eccentric bushings 77 and in these eccentric bushings, there is journaled a shaft 78 on whose intermediate portion, there is formed a smooth cylindrical roll 79 and on one of whose ends there is keyed a gear 85 which meshes with a gear 86 which is keyed to the shaft 75. In each of the eccentric bushings 77 there are formed teeth 80 which mesh with a worm 81 which is keyed to a shaft 82 which is journaled in the frame 73 above the bushing. The shafts 82 are connected by sprockets 83 and a chain 84 and their outer ends are squared so that they will fit into a socketed key. By rotating one of the shafts 82 by means of the key, one may rotate both of the eccentric bushings 77 and thus move the roll 76 toward or away from the roll 79, but it is to be noted that the chain 84 is fitted sufficiently loosely to permit the independent adjustment of the eccentric bushings 77 which may be necessary to render the spacing of the rolls 76 and 79 uniform from end to end.

In the second wire-deforming element 58, the shafts 87 which carry the rolls 89 and 90 are normally connected by gears 91 and 92 which are keyed thereto. The rolls 89 and 90 are annularly grooved and, as Figure 9 clearly shows, the annulets between the annular grooves interfit but because they are slightly relieved do not interengage when the arm 93 is in engagement with the set screw 94. So that the roll 90 may be adjusted longitudinally with respect to the roll 89 and maintained in adjusted position there are provided in the upstanding arms 95 set screws 96 which are adapted to engage the arms 93 by which the roll 90 is carried. To the upstanding arms 95, on the "discharge" side of the second wire-deforming element, there is secured a part 98 whose function is to prevent the wires emerging from between the rolls 89 and 90 following either of the rolls. The part 98 may be described as a bar through which extend slots 99 equal in number to the strands of wire from which the dust-collecting element is to be made and through each of which one of the strands passes after emerging from the rolls 89 and 90. Except as indicated above, the second wire-deforming element 58 does not differ materially from the first wire-deforming element 56.

The third wire-deforming element 59 does not differ materially from the first wire-deforming element 56 except in that the pitch of the teeth in the rolls 100 of the third wire-deforming element is different from the pitch of the teeth in the rolls 64 and 68 of the first wire-deforming element.

To the upstanding arms 62 of the first wire-deforming element 56 there are secured shelves 175 and 176 which extend, respectively, toward the fixtures 51 and toward the wire-flattening element 57. Across the outer end of the upper surface of the shelf 175 there extends a rod 177 under which the wires a travel in passing from the spools 54 to the first wire-deforming element 56 and in the upper surface of this shelf there is formed a channel 181 for the guidance of each wire between the rod 177 and the first wire-deforming element 56. In the shelf 176, which supports the wires a between the first wire-deforming element 56 and the wire-flattening element 57, there is formed a channel 182 for the guidance of each wire. To the upstanding arms 95 of the second wire-deforming element 58, there is secured a shelf 178 which extends toward the wire-flattening element 57. The shelf 178 supports the wires a between the elements between which it extends and in its upper surface there is formed a channel for the guidance of each wire. To the upstanding arms of the third wire-deforming element 59, there are secured flanged shelves 178 and 180 which extend, respectively, toward the third wire-deforming element 58 and toward the winding element 60 and support the wires a between the elements between which they extend.

To corresponding ends of the shafts 63 and 89 of the first and second wire-deforming elements there are keyed sprockets 183 and 184 and around these sprockets there passes a chain 185. To the opposite end of the shaft 63 and to the corresponding end of the shaft 75 of the wire-flattening element 57 there are keyed, respectively, a sprocket 186 and three sprockets 187, 188 and 189. Around the sprockets 186 and 188 passes a chain 190. Around the sprocket 189 and around a sprocket 191 on the corresponding end of the shaft of the third wire-deforming element 59 on which the lower roll 100 is mounted there extends a chain 192.

The winding element 60 includes a hollow shaft 101 whose end which is nearest the third wire-deforming element 59 is journaled in an upstanding arm 102 which is secured to the main frame 50. To the opposite end of the shaft 101, there is secured a cup-shaped head 103 which is, through the medium of rollers 104, journaled in an annular frame 105 which is secured to the main frame 50. To the closed end of the cup-shaped head 103, there is secured coaxially with the hollow shaft 101 a stub shaft 106 which projects into the interior of the head.

On the stub shaft 106 there is mounted through the medium of bearings 107 a block 108. The block 108 is sufficiently heavy and is mounted on the stub shaft 106 sufficiently off-center that it will not rotate when the stub shaft is rotated. In the outer face of the block 108, there is formed a deep diametrically disposed, vertically extending groove 109. The groove 109 is widened at its inner end, as indicated by the reference character 110, and at its outer end extends into a channel 111 whose side walls are grooved as indicated by the reference character 112. In the channel 111, there are located plates 113 and 114 and on each of the plates there is formed a tongue 115 which extends into one of the grooves 112. The plates 113 and 114 are adjustably secured to the block 108 by screws 116 which extend through slots 117 and on each of them there is formed an ear 118 which extends into the groove 109. In the ear 118 on the plate 113, there is journaled a shaft 119 on whose inner end there is keyed a gear 120 which meshes with a gear 121 which is coaxial with and fixed on the stub shaft 106. On the portion of the shaft 119 which projects beyond the outer face of the block 108, there formed a thread 122. In the ear 118 on the plate 114, there is journaled a shaft 123 to which is keyed a gear 124 which meshes with a gear 125 which is keyed to the shaft 119. The shaft 123 differs from the shaft 119 only in that the pitch of the thread 126 is opposite that of the thread 122 and in that a head 127 instead of a gear is provided on its inner end.

A tube 128 extends from a point beyond the end of the hollow shaft 101 nearest the third wire-deforming element 59, through the hollow shaft, a slot 129 in the wall of the hollow shaft and the head 103 to a point beyond the outer end of the block 108. As the drawing clearly shows, the end of the tube 128 nearest the third wire-deforming element 59 is of funnel-like form and the opposite end of the tube is directed toward the screw-shafts 119 and 123. The tube 128 is fixed to a block 130 carried by a grooved collar 131 which is slidable on the hollow shaft 101 and is slidable in a bearing in the end of the hollow shaft nearest the third wire-deforming element 59 and in a bearing 132 which is secured to the head 103.

Parallelly to the hollow shaft 101, there extends a shaft 133 which is journaled at its end which is nearest the third wire-deforming element 59 and intermediate its ends in a bracket 134 which is secured to the main frame 50. In the end of the shaft 133 which is furthest from the third wire-deforming element 59, there is formed a cam groove 135 in the form of two equally but oppositely pitched helices joined at their ends. Into the groove 135 extends the flattened end of a pin 136 which is rotatably mounted in a collar 137 which surrounds a part of the shaft 133 and carries a fork 138 whose prongs straddle the grooved portion of the collar 131 on the hollow shaft 101. The collar 137 also carries a tube 206 which is secured thereto by a clamp 205. The tube 206 terminates at one end adjacent the funnel-shaped end of the tube 128 and to this end of the tube 206, there is connected one end of a U-shaped tube 208 whose opposite end is directed toward the axis of the tube 128. To the end of the tube 206 distant from that to which the tube 208 is connected, there is connected one end of a flexible hose 209 whose opposite end is connected to a source of air or other gaseous fluid under pressure.

Around sprockets which are keyed respectively to the hollow shaft 101, the shaft 133 and a shaft 139 which extends parallelly to the shafts 101 and 133 and is journaled in bearings mounted on the main frame 50 extends a chain 140.

The shearing element 61 includes a bracket 141 which is secured to the main frame 50 and shears 211 dependently mounted on the bracket by the bolt 142 which pivotally connects its elements. To the upper end of each of the elements of the shears 211, there is connected one end of a chain 143 which passes over a pulley 144 and whose opposite end is connected to the bracket 141 by a spring 145. To the upper end of each of the elements of the shears, there is also pivotally connected a link 146. The links 146 are pivotally connected to each other and to the lower ends of links 147 by a bolt 148. The upper ends of the links 147 are connected to the lower end of a rod 149 of magnetic material whose upper end extends into the axis of a solenoid 150 which is fixed to the bracket 141.

On the side of the main frame 50 adjacent the end of the shaft 133 which is furthest from the third wire-deforming element 59, there is fastened a plate 151 to which is secured a stub shaft 152. On the stub shaft 152 there is mounted a flanged disc 153 which is free to rotate in a clockwise direction when it is viewed as it is shown in Figures 1 and 15. Rotation of the disc in the opposite direction is prevented by the one-way brake 154. Between the disc 153 and the plate 151, there is mounted on the stub shaft 152 an arm 155 whose upper end is urged by a spring 156 toward the outer end of a rod 157 which is carried by the collar 137 on the shaft 133. Movement of the upper end of the arm 155 toward the outer end of the rod 157 is limited by the vertical wall of a rabbet 158 in the plate 151.

To the upper end of the arm 155, a lever 159 is connected by a screw 160 which extends through an elongated slot 161 in the lever. On the lower end of the lever 159, there are formed ears 162 which are located on opposite sides of the flange of the disc 153. To the upper end of the lever 159 and to an arm 163 which is secured to the upper end of the arm 155, there is secured a spring 164 which urges the lever downwardly and in a clockwise direction when it is viewed as it is shown in Figures 1 and 15.

On the plate 151, there is mounted a switch 165 which consists of a bracket 166 secured to the plate 151 and a lever 167 pivotally connected to but electrically insulated from the bracket. The lever 167 carries a pin 168 which is maintained in contact with the flange of the disc 153 by a spring 169. The bracket 166 carries a contact element 170 and the free end of the lever 167 a contact element 171 which engages the contact element 170 when the pin 168 enters the notch 172 in the flange on the disc 153. The contact elements 170 and 171 are electrically connected to opposite ends of the solenoid 150 by wires 173 and 174 in one of which is inserted a battery or other source of electricity.

From the main frame 50, there depends a platform 193 on which there is mounted an electric motor 194 and a speed-reduction gear unit 195. On one end of the shaft 196 of the electric motor there is keyed a sprocket 197 and around this sprocket and a sprocket 198 which is keyed to the shaft 139 of the winding element 60 there passes a chain 199. The other end of the shaft 196 of the electric motor is connected to the input shaft 200 of the speed-reduction gear unit 195 by a coupling 201 and to the output shaft 202 of the speed-reduction gear unit there is keyed a sprocket 203 around which and the sprocket 187 on the shaft 75 of the wire flattening element 57 passes a chain 204.

To produce the dust-collecting element b to which the invention relates, a spool 54 of copper wire a, preferably round and 0.007" to 0.008" in diameter, is placed on each of the spindles 53 of the fixtures 51. Each strand a of wire is then lead, successively, under the rod 177 on the shelf 175, through one of the channels 181 in the shelf 175, between the rolls 64 and 68 of the first wire-deforming element 56, through one of the channels 182 in the shelf 176, between the rolls 76 and 79 of the wire-flattening element 57, through one of the channels in the shelf 178, between the rolls 89 and 90 of the second wire-deforming element 58, through one of the slots 99 in the part 98, over the shelf 179, between the rolls 100 of the third wire-deforming element 59 and over the shelf 180. The several strands a are then grouped and their ends inserted together into the funnel-like end of the tube 128.

After the foregoing procedure has been completed, the handle 71 on the first wire-deforming element 56 and the corresponding handles on the second and third wire-deforming elements 58 and 59 are moved to the positions in which the teeth or annulets on the upper roll of each wire-deforming element interfit with the teeth or annulets on the lower roll thereof and the upper roll of the wire-flattening element 57 is adjusted to the proper position with respect to the lower roll thereof.

Then the electric motor 194 is started and fluid under pressure admitted to the tube 209. Rotation of the shaft of the electric motor causes synchronous operation of the wire-deforming, wire-flattening and winding elements at such rates that the portions of the wires a between the adjacent elements are not stretched and do not become undesirably slack. Rotation of the shaft of the electric motor also causes operation of the shearing element, and admission of air under pressure to the tube 209 causes a current of air to flow through the tube 128.

Rotation of the shaft of the electric motor 194 is transmitted to the rolls of the wire-deforming and wire-flattening elements through the speed-reduction gear unit 195 and the sprockets and chains which connect it with the shafts of the wire-deforming and wire-flattening elements. The rolls of the wire-deforming and wire-flattening elements grip the wires a, unwind them from the spools 54 and cause them to advance toward the winding element 60. During their passage between the rolls 64 and 68 of the first wire-deforming element 56, the wires are corrugated transversely. During the passage of the wires between the rolls 76 and 79 of the wire-flattening element 57, their sides which are in planes parallel to that of the corrugations produced by the first wire-deforming element 56 are flattened. During their passage between the rolls 89 and 90 of the second wire-deforming element 58, the wires are corrugated longitudinally and in directions at right angles to the directions of the corrugations produced by the first wire-deforming element 56. During their passage between the rolls of the third wire-deforming element 59, the wires are again corrugated transversely but in directions at right angles to the directions of the corrugations produced by the first wire-deforming element 56. Because the pitch of the teeth in the rolls of the third wire-deforming element is different from the pitch of the teeth in the rolls of the first wire-deforming element, the corrugations produced by the third wire-deforming element will not be spaced uniformly with respect to the corrugations produced by the first wire-deforming element. It is preferable, if wire of the preferred size is used as stock, that the rolls of the wire-deforming and wire-flattening elements be so adjusted that when the wires emerge from between the rolls of the third wire-deforming element they will be 0.0018" to 0.0015" thick and 0.022" to 0.032" wide.

It is to be noted that while the transverse corrugations imparted to the wires a by the first and third wire-deforming elements are produced principally by bending the wires, the longitudinal corrugations imparted to the wires by the second wire-deforming element are produced principally by stretching the wires. The transverse corrugations impart elasticity to the wires and the longitudinal corrugations which are much narrower and shallower than the transverse corrugations serve principally as liquid-retaining channels in the dust-collecting element into which the wires a are made.

Rotation of the shaft of the electric motor 194 is transmitted to the shaft 139 of the winding element 60 by sprockets 197 and 198 and the chain 199 and from the shaft 139 to the shafts 101 and 133 by the sprockets and chain which connect them. Rotation of the shaft 101 does not cause the screw-shafts 119 and 123 to move bodily but does cause them to rotate in opposite directions around their respective axes and causes the end of the tube 128 which is directed toward the screw-shafts 119 and 123 to revolve around them. When the shaft 133 rotates, the collar 137 reciprocates on the shaft 133 and the tube 128 reciprocates in its bearings in the hollow shaft 101 with the result that the end of the tube 128 which is directed toward the screw-shafts 119 and 123 moves constantly back and forth axially of the screw-shafts 119 and 123 as it revolves around them.

Initially, the group c of strands which is inserted into the tube 128 is advanced therethrough solely by the current of air which flows therethrough. But as the group of strands emerges from the end of the tube 128 which is directed toward the screw-shafts 119 and 123, the end of the group is caught by the screw-shafts and, thereafter, the group is wound on the screw-shafts as it emerges from the end of the tube and is advanced through the tube by the joint action of the current of air and the pull exerted on it by reason of the fact that it being wound on the screw-shafts.

The rotary movement of the tube 128 causes each strand of the group which travels therethrough to be wound helically around the others and transforms the group of strands into a loosely twisted, rope-like structure. The combined rotary and reciprocatory movement of the end of the tube 128 which is directed toward the screw-shafts 119 and 123 causes the twisted group of strands, as it emerges from the end of the tube 128, to be wound around the screw-shafts for two helical turns in one direction axially of the screw-shafts and for the same number of helical turns in the opposite direction axially of the screw-shafts, alternately, as long as the machine operates. The concurrent rotation of the screw-shafts 119 and 123 about their respective axes constantly moves the tubular element b thus formed toward and off the outer ends of the screw-shafts and, consequently, the length of the windings in one direction axially of the screw-shafts will be greater than the length of the windings in the opposite direction and the corresponding turns of successive windings in one direction will not be superposed but will lie alongside each other.

From what has been said, it will be clear that there will result from operation of the machine illustrated and described a tubular element of indefinite length whose wall is a number of times thicker than the group c of strands of which it is composed and whose constituent strands are maintained in the relative positions in which they are wound by interengagement of the corrugations in the contiguous strands which also serve to prevent the contiguous strands from interfitting too closely. The group c of strands can be fabricated by the machine illustrated and described into a tubular element whose wall is a number of times thicker than the group of strands because the strands a are elastic and capable of being stretched when the circumference of the body on which they are being wound increases. Because the portions of the strands a adjacent the outer wall of the tubular element b are stretched more than the portions thereof adjacent the inner wall of the tubular element, during fabrication of the tubular element, the tension in the portions of the strands adjacent the outer wall of the tubular element will be greater than the tension in the portions thereof adjacent the inner wall of the tubular element and the tension in the portions of the strands adjacent one end of each "winding" of the group c will be greater than the tension in the portions thereof adjacent the other end of the "winding."

From the shafts 119 and 123, the tubular element b passes between the elements of the shears 211 and into a trough 210 which is supported by the bracket 141.

Each time that the collar 13 moves toward the right on the shaft 133 when the machine is viewed as it is shown in Figures 1 and 15, the rod 157 engages the arm 155 and through the lever 159 causes the disc 153 to rotate through a predetermined angle in a clockwise direction. Once during each revolution of the disc 153, the pin 168 on the lever 167 of the switch 165 enters the notch 172 in the flange on the disc 153 and the circuit through the solenoid 150 is closed. When the solenoid is thus energized, the rod 149 is raised, the elements of the shears are brought together and the tubular element severed. When the circuit through the solenoid is opened the solenoid is de-energized and the elements of the shears are moved apart by the springs 145. The frequency of operation of the shears and, consequently, the length of the lengths of tubular element b produced by the machine may of course be varied by adjusting the length of the rod 157.

Because Figure 22 in which there is shown a length of the tubular element b, does not disclose clearly the construction of the element and it has been found impossible by depicting the tubular element itself to convey a clear conception of its construction, there have been included in the drawings Figures 23 and 24 which clearly disclose the formation and construction of the tubular element b. In Figures 23 and 24, the part to which the reference character n is applied represents the "core" of the group of strands a of copper wire from which the tubular element b is formed. In forming the tubular element b, one end d of the group of strands is connected, temporarily at least, to an arbor, such as the screw-shafts 119 and 123, and the group of strands wound around the arbor for two turns axially of the arbor to the point e; then the direction of winding axially of the arbor is reversed and the group of strands wound around the arbor for two more steeply pitched turns to the point f; from the point f the winding proceeds as from the point d and the described procedure is repeated indefinitely. In Figures 23 and 24, the portions of the turns of the part n which are on the side of the tubular element b which is nearest the observer are shown in heavy solid lines and those which are on the side of the tubular element farthest from the observer are shown in dotted lines. To avoid confusion more than four turns of the part n have not been shown in Figure 23 but in order to illustrate completely the construction of the tubular element b all of the turns of the group of strands which are present in a length of the element b have been represented in Figure 24.

To illustrate how the dust-collecting element to which this invention relates is utilized in an air cleaner, I have shown in Figure 25 of the drawings a combined air cleaner and resonator silencer in which the element is incorporated. The combined air cleaner and resonator silencer shown in Figure 25 includes a shell g in whose upper end there is a generally cylindrical compartment h through whose outer wall extend air intake openings i and into whose bottom there extends a tube j which communicates with a tube k which is adapted to be connected to the air intake tube of the carburetor of an internal combustion engine. In the compartment h between the openings i and the tube j, there is interposed an annular dust-collecting element l which consists of a liquid-coated length of the tubular element $b$ located between screens $m$ and $o$. Air which enters the openings $i$ must pass through the annular dust-collecting element $l$ and be freed from dust and other foreign matter before it reaches the carburetor or cylinders of the engine. It will be noted that when a length of the tubular element $b$ is bent into annular form, the interstices at the inner edge are made smaller and those at the outer edge larger with the result that a dust-collecting element whose efficiency is greater at its inner than its outer edge is produced. Although in the combined air cleaner and resonator silencer shown in Figure 25, there is only one turn of the tubular element $b$ in the dust-collecting element, it will be understood that several turns of the tubular element, superposed radially and/or axially, may be employed in a dust-collecting element if sufficient space is available and a greater volume of dust-collecting element is desired.

I claim:

1. The method of making a dust-collecting element which consists of winding a strand around an axis so that it advances alternately in one direction and in the opposite direction along the axis as it advances around it, the distance of advance in one direction along the axis being greater than in the other so that a body of increasing length is produced.

2. The method of making a dust-collecting element which consists of winding a group of flattened and deformed strands around an axis so that it advances alternately in one direction and in the opposite direction along the axis as it advances around it, the distance of advance in one direction along the axis being greater than in the other so that a body of increasing length is produced.

3. The method of making a dust-collecting element which consists of winding a twisted group of strands around an axis so that it advances alternately in one direction and in the opposite direction along the axis as it advances around it, the distance of advance in one direction along the axis being greater than in the other so that a body of increasing length is produced.

4. The method of making a dust-collecting element which consists of winding a strand around an axis so that it advances alternately in opposite directions along the axis as it advances around it and simultaneously advancing the body thus produced along the axis.

5. An interstitial body in which there is included a strand of dense, deformation resisting material wound upon itself lengthwise and around the axis of the body a plurality of times with windings of different length in one direction than the other lengthwise of the body.

6. An interstitial body which includes an element wound upon itself lengthwise and around the axis of the body a plurality of times with windings of different pitch and length in one direction than the other lengthwise of the body.

7. An interstitial body which includes a group of deformed strands wound upon itself lengthwise and around the axis of the body a plurality of times with windings of different length in one direction than the other lengthwise of the body.

8. An interstitial body which includes an element wound upon itself lengthwise and around the axis of the body a plurality of times with windings of different length in one direction than the other lengthwise of the body bent into generally ring-like form.

9. The method of making a body which consists of winding a strand around an axis so that it advances alternately in opposite directions along the axis as it advances around it and simultaneously advancing the body thus produced along the axis.

10. An interstitial dust collecting body which includes an element wound upon itself lengthwise and around the axis of the body a plurality of times with windings of greater length in one direction than the other lengthwise of the body.

11. An interstitial dust collecting body which includes a group of deformed strands wound upon itself lengthwise and around the axis of the body a plurality of times with windings of greater length in one direction than the other lengthwise of the body.

12. An interstitial dust collecting element which includes a loosely twisted group of flat metal strands which have in them angularly related transversely extending corrugations and smaller lengthwise extending corrugations wound upon itself lengthwise and around the axis of the element a plurality of times with windings in one direction lengthwise of the element of lesser length than and only partly overlapping preceding windings in the other direction lengthwise of the element and windings in the other direction lengthwise of the element of greater length than and completely overlapping and in one direction lengthwise of the element extending beyond preceding windings in the first mentioned direction lengthwise of the element.

13. An interstitial dust collecting element which includes a loosely twisted group of strands wound upon itself lengthwise and around the axis of the element a plurality of times with windings in one direction lengthwise of the body of lesser length than and only partly overlapping preceding windings in the other direction lengthwise of the body and windings in the other direction lengthwise of the body of greater length than and completely overlapping and in one direction lengthwise of the body extending beyond preceding windings in the first mentioned direction lengthwise of the body.

14. The method of making a dust collecting element which consists of loosely twisting a group of deformed strands, winding the loosely twisted group of deformed strands around an axis so that it advances alternately in opposite directions along the axis as it advances around it and simultaneously advancing the body thus produced along the axis, and severing the body thus produced into lengths.

15. The method of making a body which consists of winding a strand around an axis so that it advances in opposite directions along the axis as it advances around it and simultaneously advancing the body thus produced along the axis, and severing the body thus produced into lengths.

16. The method of making a dust collecting element which consists of winding a group of metal strands around an axis so that it advances alternately in one direction and in the opposite direction along the axis as it advances around it, the distance of advance in one direction along the axis being greater than in the other so that a body of increasing length is produced.

HARTWELL W. WEBB.